United States Patent [19]
Benedict

[11] Patent Number: 5,967,409
[45] Date of Patent: Oct. 19, 1999

[54] TEMPERATURE RESPONSIVE VALVES AND METHOD OF REGULATING FLUID FLOW THERETHROUGH

[75] Inventor: Charles E. Benedict, Tallahassee, Fla.

[73] Assignee: Benedict Engineering Company, Inc., Tallahassee, Fla.

[21] Appl. No.: 09/075,166

[22] Filed: May 11, 1998

Related U.S. Application Data

[63] Continuation-in-part of application No. 08/885,804, Jun. 30, 1997, abandoned, which is a continuation-in-part of application No. 08/664,545, Jun. 17, 1996, Pat. No. 5,803,354.

[51] Int. Cl.⁶ .................................................. G05D 27/00
[52] U.S. Cl. .................. 236/92 R; 236/93 R; 236/101 D
[58] Field of Search ................... 236/93 R, 93 B, 236/101 D, 92 R, 92 C, 85

[56] References Cited

U.S. PATENT DOCUMENTS

| | | | |
|---|---|---|---|
| 3,174,410 | 3/1965 | Booth et al. | 236/92 R |
| 3,436,017 | 4/1969 | Elmer | 236/92 R |
| 4,227,646 | 10/1980 | Hart et al. | 236/101 D |
| 4,570,851 | 2/1986 | Cirillo | 236/93 R |
| 4,778,104 | 10/1988 | Fisher | 236/101 D |
| 4,848,653 | 7/1989 | Van Becelaere | 236/101 D |
| 4,932,429 | 6/1990 | Watanabe et al. | 236/101 D |
| 5,014,520 | 5/1991 | Orner et al. | 236/101 D |
| 5,123,593 | 6/1992 | Rundle | 236/101 D |

*Primary Examiner*—William E. Tapolcai
*Attorney, Agent, or Firm*—Dowell & Dowell, P.C.

[57] ABSTRACT

Temperature responsive valves for regulating fluid flow in a supply line such as to a showerhead or faucet wherein the valves include a slide valve assembly which is movably positioned within a bore extending in transverse communication with respect to a primary fluid passageway extending through the body of the valve between a fluid inlet and an outlet. Each valve further includes a pressure chamber in which the slide valve assembly is mounted which communicates with the fluid inlet. Temperature responsive force generators are used to control flow into the pressure chamber such that when the fluid temperature is above a predetermined temperature, the pressure within the pressure chamber increases, thereby forcing the slide valve assembly from an open to a closed position to thereby substantially terminate flow through the primary fluid passageway. A bleed channel extends from the pressure chamber to the primary fluid passageway downstream of the bore for purposes of regulating flow through the pressure chamber. In a preferred embodiment, a shaped memory alloy spring is mounted within the pressure chamber so as to be in heat exchange relationship at all times with respect to fluid flowing into the valve and is operable when heated to the predetermined temperature to initiate movement of the slide valve assembly toward a position to close the primary fluid passageway.

36 Claims, 5 Drawing Sheets

TEMPERATURE RESPONSIVE VALVES AND METHOD OF REGULATING FLUID FLOW THERETHROUGH

CROSS REFERENCES TO RELATED APPLICATIONS

This application is a continuation-in-part application of Ser. No. 08/885,804 filed Jun. 30, 1997 abandoned entitled TEMPERATURE RESPONSIVE FLUID FLOW CONTROL VALVES which is a continuation-in-part application of U.S. application Ser. No. 08/664,545 filed Jun. 17, 1996 now U.S. Pat. No. 5,803,354, entitled TEMPERATURE RESPONSIVE FLUID FLOW CONTROLLERS, both applications in the name of the present inventor.

BACKGROUND OF THE INVENTION

This invention is generally directed to fluid flow control valves and methods of regulating fluid flow therethrough and, more particularly, to valves which are responsive to the temperature of fluid flowing therethrough for purposes of reducing flow when temperatures above a predetermined temperature are sensed. The method of the invention and the valves use fluid pressure to ensure effective valve responsiveness dependent upon fluid temperature. The invention is also directed to such valves and methods of manually adjusting the valves to vary flow rate when fluid temperatures are below the predetermined temperature.

It is often necessary to control the flow of hot gases or liquids to ensure industrial processing or to protect individuals from injury due to exposure. By way of example, in commercial and residential hot water systems intended for personal use, water temperatures will frequently exceed 125° to 130° F. At these temperatures, an individual can easily be scalded or burned by contact with the hot water in a few seconds. The regulation of water temperature becomes more critical in commercial environments where a large source of supply is necessary during relatively short demand periods, such as mornings and evenings, when water temperatures are elevated in boilers or heaters to ensure hot water is available to individual outlets. Even in household environments, a hot water heater may be set to a temperature in excess of 130° F. for purposes of providing sufficiently hot water for bathing, dishwashing and clothes washing. Under these circumstances, it is critical to ensure that individuals are protected from the hot water to prevent injury.

One of the problems with regulating fluid supplies depending upon temperature is the cost of control systems which can adequately function. The use of electronically controlled valves has not been satisfactory for commercial and residential uses. However, through the development of temperature sensitive metal alloys, mechanically operated valves have been made which are mechanically actuated in response to fluid temperatures at lower costs.

Such mechanical valves incorporate springs made of metal alloys which vary their force depending upon the temperature of a fluid to which they are exposed. Such memory alloy springs exhibit a first biasing force in a martensitic state and a greater force at elevated temperatures in a austenitic state. These type of springs can be treated so as to exhibit a transformation from the martensitic to the austenitic state at predetermined temperatures so that they change their biasing force dependent upon a selected or predetermined temperature. Examples of valves incorporating shaped memory alloy springs are disclosed in U.S. Pat. Nos. 4,778,104 to Fisher, 4,848,388 to Waldbusser, 5,259,554 to Ewing, et al. and 5,261,597 to Perlman, et al.

Many prior art valves incorporating shaped memory alloy springs are not designed to operate consistently within a preselected temperature range, especially if fluid pressures within a supply line vary. In most systems, springs are placed in line with the fluid flow through a valve and are subject to variations in fluid pressure. Other valves which incorporate shaped memory alloy springs to provide for automatic control of a valve mechanism dependent upon the temperature of the fluid flowing therethrough do not allow springs to be continuously in heat exchange relationship with fluid flowing through the valves and therefore are not adequate for many uses.

In U.S. Pat. No. 5,123,593 to Rundle, a fluid flow controller for regulating a source of hot liquid is disclosed which includes a pair of springs which operate to open and close a ball valve with respect to a seat within the controller. A first shaped memory alloy spring is placed in communication with fluid flowing from a supply source and is activated by the temperature of the fluid through the controller upstream of the valve seat. When the fluid temperature increases above a predetermined temperature, the first spring activates the ball valve to close against the valve seat and thereby terminate fluid flow. The second spring is mounted on the downstream side of the ball valve and is operable when the fluid temperature to the inlet of the flow controller drops below a predetermined temperature to overcome the pressure of the first spring and thereby open the ball valve to allow fluid flow through the controller. This type of valve does not provide for any manual adjustment of the flow rate through the valve. Further, when the first spring is activated, flow of fluid through the valve is terminated and there is no provision for allowing fluid from the source to trickle through the closed valve so as to be in heat exchange relationship with the first spring. Therefore, the first spring cannot react quickly to upstream changes in fluid temperature to permit the valve to be re-opened in a timely manner.

SUMMARY OF THE INVENTION

The present invention is directed to temperature responsive valves and methods for regulating the flow of substantially any fluid, liquid or gas, through a supply line having particular utility in regulating the supply of hot water to faucets and showerheads in commercial and residential environments dependent upon the temperature of the hot water. The valves include housings or bodies each having a fluid inlet and a fluid outlet which are in communication with respect to one another through a primary fluid passageway. A bore is provided through each housing transversely with respect to the primary fluid passageway, and in communication therewith, in which a slide valve assembly is movably received. The slide valve assembly includes a piston member which is moveable within a pressure chamber defined within the bore between an "open" position wherein fluid flow is at a maximum through the primary fluid passageway and a "closed" position wherein the slide valve assembly substantially terminates fluid flow through the primary fluid passageway. A secondary fluid passageway is opened to communicate with the pressure chamber by the activation of a temperature response force generator, such as a shaped memory alloy (SMA) spring, bi-metallic spring, wax or other material which changes its physical properties in response to the temperature of the fluid flowing into the valve.

In a first embodiment, a temperature responsive force generator is mounted within the pressure chamber and the piston member of the slide valve assembly includes a skirt which blocks or substantially blocks the secondary fluid passageway into the pressure chamber when the slide valve assembly is in the "open" position. When the temperature of the fluid entering the valve is above a predetermined activation temperature, the temperature responsive force generator, such as a SMA spring, changes state and responds by shifting the slide valve assembly toward the "closed" position, which movement opens the secondary fluid passageway thereby providing a pressure source which acts on the piston member of the slide valve assembly and forces the assembly to the "closed" position.

Also, in the first embodiment, a manually adjustable piston which extends outwardly from the valve housing. The manually adjustable piston is engageable with the slide valve assembly within the pressure chamber. By urging the piston into the bore, the slide valve assembly may be shifted so as to adjust the fluid flow rate and substantially terminate fluid flow through the primary fluid passageway when the fluid temperature is below the predetermined activation temperature. Should the fluid temperature increase above the predetermined activation temperature, the SMA spring changes state and will drive the manually adjustable piston to a fully "open" position and force the slide valve assembly toward the "closed" position, at which time fluid flow through the primary fluid passageway is substantially terminated. In some instances, however, a bleed flow continues to be maintained through the secondary fluid passageway and the pressure chamber.

To regulate the pressure within the pressure chamber relative to the fluid flowing through the primary fluid passageway, a venturi-like bleed channel is provided through a portion of the valve housing which communicates the pressure chamber to a downstream point along the primary fluid passageway which is spaced between the bore and the valve outlet. The venturi effect created by the bleed channel can be increased by providing a venturi tube which extends from the bleed channel into the primary fluid passageway. The venturi tube thereby regulates pressure or creates a partial vacuum within the pressure chamber to draw fluid into the pressure chamber from the secondary fluid passageway and then to the primary fluid passageway downstream of the bore.

In another embodiment, the secondary fluid passageway to the pressure chamber may be normally closed or partially closed by a pressure responsive force generator, such as a temperature response valve positioned to control flow through the secondary fluid passageway. In this embodiment, the piston member of the slide valve assembly does not completely block the secondary fluid passageway when the assembly is in the "open" position. When the temperature of the fluid increases above the predetermined activation temperature, the temperature response valve will open to allow fluid flow through the secondary fluid passageway, and, thereafter, the pressure of the fluid against the piston member of the slide valve assembly will cause the slide valve assembly to move to the "closed" position to terminate fluid flow through the primary fluid passageway.

In some embodiments of the present invention, the slide valve assembly further includes a head portion having an extension which is designed to extend outwardly of the housing from the bore when the valve assembly is in the "closed" position. The head portion is connected to the piston member by a reduced stem around which fluid passes when the slide valve assembly is in a fully or partially open position. A face of the base of the piston member and an opposing face of the head portion of the slide valve assembly are of equal size and normally directly exposed to the fluid flowing through the primary fluid passageway so that fluid pressures are balanced against the opposing faces. However, when fluid pressure is applied to the piston member from within the pressure chamber, the pressure is no longer balanced and the slide valve assembly shifts quickly toward the "closed" position.

Although the slide valve assembly may be directly mounted within the bore of the valve housing, in preferred embodiments, the slide valve assembly is mounted within a hollow piston which is slidably mounted within the bore. The hollow piston includes generally aligned primary fluid inlet and outlet openings therethrough which communicate with the primary fluid passageway and secondary inlet and outlet openings for communicating the pressure chamber with fluid entering the valve housing and the bleed channel, respectively. In these embodiments, manual control of the fluid flow rate is adjusted by shifting the hollow piston within the bore to thereby alter the degree of communication between the primary inlet and outlet openings in the hollow piston with the primary fluid passageway.

The temperature responsive valves may be constructed to either be manually or automatically reset or moved to the "open" position after the slide valve assembly has been moved to the "closed" position and when the fluid temperature is below the predetermined activation temperature. In the manual mode, an extension of the head portion of the slide valve assembly is pushed inwardly relative to the valve housing to thereby open the primary fluid passageway. In the automatic mode, an end portion of the hollow piston in which the slide valve assembly is mounted defines a secondary spring cavity in which a second spring is housed so as to apply a force opposing the expansion forces of the first spring or temperature responsive force generator housed in the opposing pressure chamber within the hollow piston. The second spring applies a constant force against the head portion of the slide valve assembly. When the fluid temperature falls below the predetermined activation temperature, a force generator, such as a SMA spring, will change state at which time the force of the second spring will overcome the force of the force generator and thereby shift the slide valve assembly to the "open" position within the hollow piston.

It is a primary object of the present invention to provide valves which are responsive to the temperature of fluid flowing therethrough to substantially terminate the flow of fluid when the temperature is above a predetermined activation temperature and wherein the valves include a slide valve assembly, movable relative to a primary fluid flow passageway, which is shiftable under the direct influence of a temperature responsive force generator, such as a SMA spring, which is maintained in continuous heat exchange relationship with fluid flowing through such valves.

It is a further object of the present invention to provide temperature responsive valves which include a temperature responsive force generator, such as a SMA spring, for automatically initiating movement of a slide valve assembly toward a "closed" position to substantially terminate fluid flow and wherein the slide valve assembly may be manually adjusted, at temperatures below a predetermined activation temperature, to regulate the fluid flow rate.

It is yet another object of the present invention to provide temperature responsive valves, each of which includes a slide valve assembly operable in response to a temperature responsive force generator, such as a SMA spring, and wherein fluid pressure through a secondary fluid passageway of each valve is used to provide a driving force to move the slide valve assembly to a "closed" position.

It is also an object of the present invention to provide temperature responsive valves each having temperature responsive force generators, such as a SMA spring or temperature responsive valve, for initiating closure of a slide valve assembly at temperatures above a predetermined activation temperature and wherein each valve includes a venturi bleed to regulate fluid flow and pressure within a pressure chamber in which the slide valve assembly is movably housed.

It is another object of the present invention to provide temperature responsive valves each of which utilize a temperature responsive force generator, such as a SMA spring, to permit the pressure of a fluid flowing through the valves to shift a slide valve assembly to a "closed" position to terminate fluid flow through a primary fluid passageway at temperatures above a predetermined activation temperature and wherein the slide valve assembly is either manually or automatically shifted to an open position when the fluid temperature drops below the predetermined activation temperature.

It is another object of the present invention to provide a method of substantially terminating fluid flow through a valve by using a temperature responsive element to permit the pressure of fluid flowing through the valve to control the movement of a slide valve assembly relative to a primary fluid passageway through the valve.

BRIEF DESCRIPTION OF THE DRAWINGS

The present invention will be better understood with reference to the attached drawings, wherein.

DESCRIPTION OF THE PREFERRED EMBODIMENTS

With continued reference to the drawing figures, each of the temperature responsive valves of the present invention includes a body or housing 1 which may be formed of a suitable material and which includes a fluid inlet 2 and an outlet 3. The outlet 3 may extend through a bulb connector 4 which is formed with the housing and which is utilized to receive a fixture such as a showerhead (not shown) or through a threaded end 4' or other desirable configurations.

A primary fluid passageway 5 extends through each housing 1 and includes an inlet section 6 which is in communication with an outlet section 7. In some embodiments, an angled intermediate section 8 communicates with the inlet and outlet sections. The intermediate section allows the inlet 6 to be made in off-set relationship with respect to the central axis of the body 1, shown at A—A in FIG. 1. A bore 9 extends through the housing transversely, preferably generally perpendicularly, with respect to the primary fluid passageway and in communication therewith.

Figures 1, 2, 4:
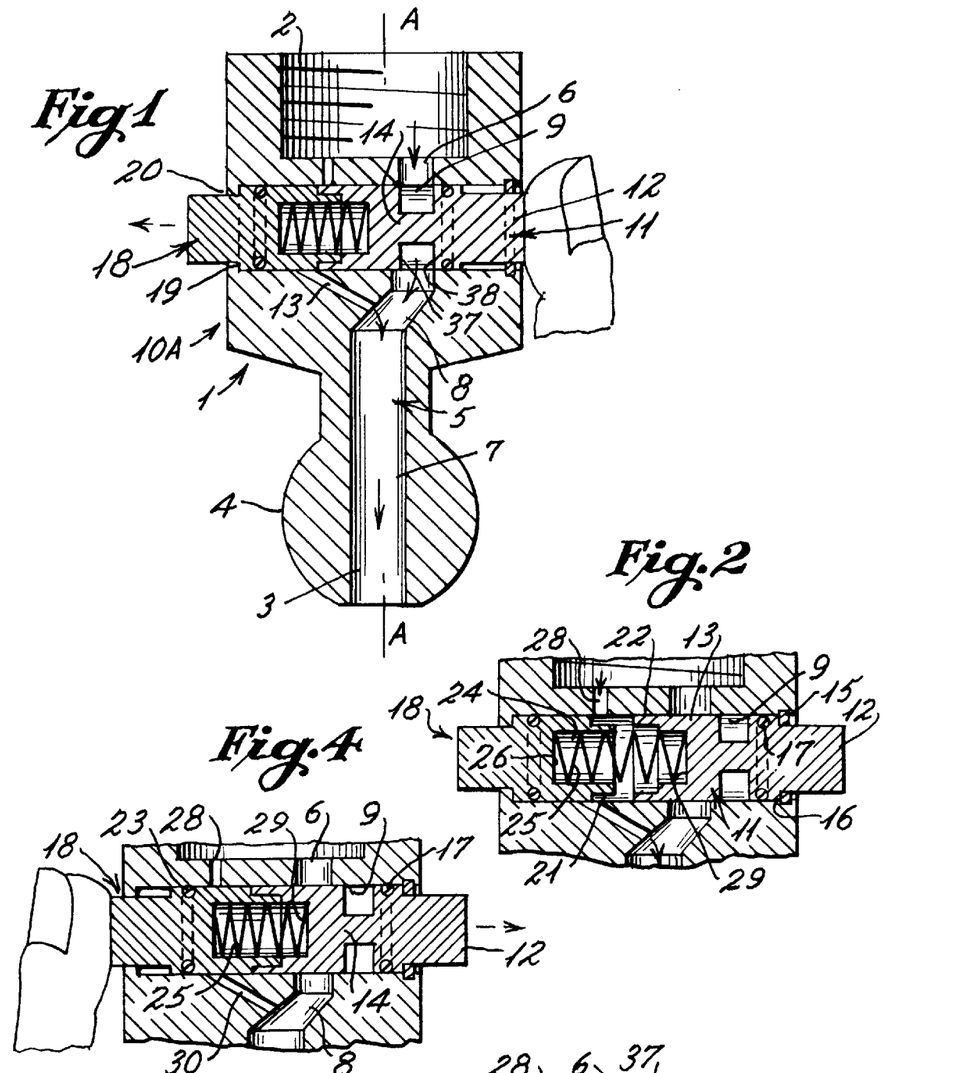
FIG. 1 is a cross-sectional illustrational view of a first embodiment of temperature responsive valve of the present invention showing a slide valve assembly engageable by a temperature responsive force generator seated within a cross bore in the valve housing and wherein the slide valve assembly is manually moved to a first position wherein a primary fluid passageway is "open" to allow flow therethrough.
FIG. 2 is a partial cross-sectional view of the temperature responsive valve shown at FIG. 1 showing the slide valve assembly shifted by action of a temperature responsive force generator to close the primary fluid passageway when the fluid temperature is above a predetermined activation temperature.
FIG. 4 is a partial cross-sectional illustrational view similar to FIG. 3 showing the manually adjustable piston being urged so as to move the slide valve assembly to substantially terminate fluid flow through the primary flow passageway of the valve.

In a first embodiment of manually resettable temperature responsive valve 10A, a slide valve assembly 11 is movably received within the bore. The assembly includes a head 12 connected to a piston member 13 by a narrow stem 14. The stem 14 is normally aligned with the primary fluid passageway to allow fluid flow through the valve when the slide valve assembly is in the "open" position shown in FIG. 1. The slide valve assembly is retained within the bore by a snap ring 15 which is seated within an annular recess formed adjacent an opening of the bore in a sidewall of the housing. The head 12 includes a outwardly extending portion which defines a shoulder 16 which abuts the snap ring 15 when the slide valve is moved to a fully "closed" position, as shown in FIG. 2. The head of the slide valve assembly is sealed by an O-ring 17 to prevent fluid from leaking to the bore opening.

An opposite opening of the bore is normally closed by a manually adjustable piston 18 having an enlarged base which forms a shoulder 19 which abuts an annular flange 20 molded or otherwise formed with the housing 1 and which limits the movement of the piston 18 to the left of the bore when in the position shown in FIG. 2. The inner end portion of the base defines an annular flange 21 of a reduced diameter to allow clearance between the flange and an outer annular flange or skirt 22 of the piston member 13 of the slide valve assembly 11. An O-ring 23 is provided for sealing the manually adjustable piston relative to the bore to prevent any fluid from leaking between the piston 18 and the sidewalls defining the bore.

The annular flange 22 and piston member 13 of the slide valve assembly are of a size and configuration to be slidingly received within the bore and to define an interior cavity 24 or pressure chamber in which one end of a temperature responsive force generator is seated. The temperature responsive force generator in some embodiments may be substantially any element which changes physical state in response to temperature, such as a shaped memory alloy (SMA) spring, bi-metallic material or wax, however, in the preferred embodiments, the force generator is a SMA spring 25. The SMA spring also engages an inner face 26 of the manually adjustable piston 18. The SMA spring is designed to change from a martensitic to an austenitic state and expand at a predetermined activation temperature.

Normally, when fluid is flowing through the primary fluid passageway at a temperature below the predetermined activation temperature, the slide valve assembly 11 will be in the "open" position shown in FIG. 1 allowing fluid flow. However, when the fluid temperature increases above the activation temperature, the SMA spring will change state and expand thus initiating a force to shift the slide valve assembly toward the "closed" position shown at FIG. 2 wherein flow is terminated through the primary fluid passageway. Although the SMA spring may be used as the primary driving force to shift the slide valve assembly to the closed position of FIG. 2, in the preferred embodiment, the spring need only shift the valve assembly a sufficient distance to move the annular skirt portion 22 of the piston member 13 to the right, as shown in the drawing figures, to open a secondary fluid passageway 28 into communication with the pressure chamber 24. The pressure of the fluid flowing into the pressure chamber through passageway 28 will act on face 29 of the piston member forcing the slide valve assembly immediately to the "closed" position, as shown in FIG. 2.

The slide valve assembly, when in the "open" position, is normally only exposed to the pressure of fluid flowing through the primary fluid passageway 5. This flow exerts equal and opposite pressures on opposing and equally sized faces 37 and 38 of the piston member 13 and head 12 of the slide valve assembly on opposite sides of the stem 14. Thus, when pressure is applied to the opposite face 29 of the piston member, the slide valve is positively forced by fluid pressure to the "closed" position.

Figure 3:
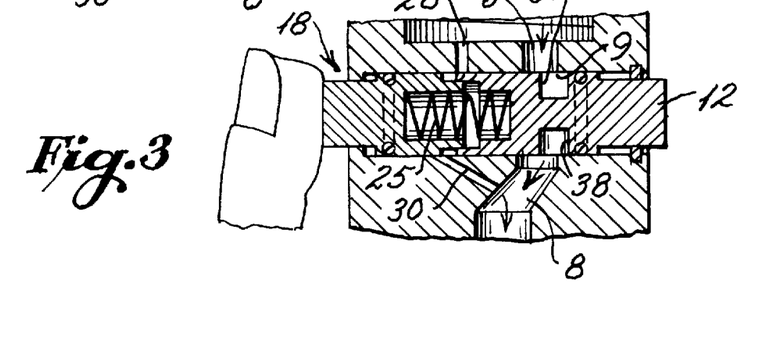
FIG. 3 is a partial cross-sectional illustrational view of the temperature responsive valve of FIG. 1 showing a manually adjustable piston being moved to urge the slide valve assembly to reduce the fluid flow rate through the primary fluid passageway when the fluid temperature is below the predetermined activation temperature.

It is important to ensure that the force generator, such as a SMA spring, is continuously in heat exchange relationship with the fluid flowing through the valve so as to accurately control the opening and closing of the slide valve assembly. In this respect, a small clearance may be provided between the secondary fluid passageway 28 and the annular flange 22 of the piston member to allow restricted or limited flow between the fluid inlet 2 of the housing and the pressure chamber 24 in which the SMA spring or other force generator is seated. Fluid is continuously allowed to pass through the chamber when the slide valve assembly is in essentially any position relative to the bore. The tolerance of an interference fit between the annular flange 21 of the manually operable piston 18 of the annular flange 22 of the slide valve assembly, such as shown in FIGS. 3 and 4, are such as to prevent fluid pressure in passageway 28 from separating the members from each other unless acted upon by the spring 25, thereby allowing manual control of the slide valve assembly. However, in some embodiments, the slide valve assembly may be formed of a heat conductive metal. In these embodiments, the SMA spring will be responsive to the temperature of the fluid flowing into the valve by conduction and no bleed or trickle flow is necessary through the secondary fluid passageway.

To regulate pressure within the pressure chamber and to permit fluid flow therefrom, the temperature responsive valve includes a venturi-like bleed channel 30 which extends from the pressure chamber 24 diagonally to the intermediate section 8 of the primary fluid passageway 5. In this manner, fluid is permitted to continuously drain from the pressure chamber through the bleed channel 30 into the downstream primary fluid passageway. The relative dimensions of the secondary fluid passageway and the bleed channel can be varied to obtain desired operating pressures and rate of fluid flow into and from the pressure chamber.

Should the temperature of the fluid on the inlet side of the temperature responsive valve fall below the predetermined activation temperature, the slide valve assembly of the present embodiment may be manually reset from the "closed" position shown in FIG. 2, by urging the slide valve assembly to the left, to the "open" position shown in FIG. 1. When the slide valve assembly is manually moved to the "open" position, the skirt 22 will partially obstruct the secondary fluid passageway, preferably allowing a trickle flow however through the pressure chamber to the bleed channel 30 so that the force generator, such as spring 25, is in heat exchange relationship with the fluid flow.

To control the rate of fluid flow through the primary fluid passageway of valve 10A, or to terminate flow therethrough, the manually adjustable piston 18 may be urged, as shown in FIGS. 3 and 4, to move or shift the SMA spring and the slide valve assembly to the right in the drawing figures and thereby adjust the degree of opening of the primary fluid passageway relative to the stem 14 of the slide valve assembly. When the slide valve assembly has been moved to reduce the fluid flow rate, as shown in FIG. 3, should fluid temperature increase above the predetermined activation temperature, the slide valve assembly will be moved to the "closed" position of FIG. 2 under the force of the spring and fluid pressure within the pressure chamber and the manual piston 18 will also be forced to the position shown in FIG. 2. Substantially complete flow termination is shown in FIG. 4, however, a trickle flow may still be permitted through the secondary fluid passageway 28 and the bleed channel 30.

It should be noted that the SMA spring may be selected so as to expand at controlled rates as the temperature of the fluid increases so that a more gradual regulation of the slide valve assembly to terminate flow through the primary fluid passageway may be achieved.

Although not shown in the drawing figures, it is possible that the manually adjustable piston 18 may be dispensed with and that a closure plug be provided in its place to seal the opening in the housing defining one end of the bore 9. In such an embodiment, manual adjustment of the fluid flow rate would not be possible other than when opening the slide valve assembly, as shown in FIG. 1.

Figure 4A:
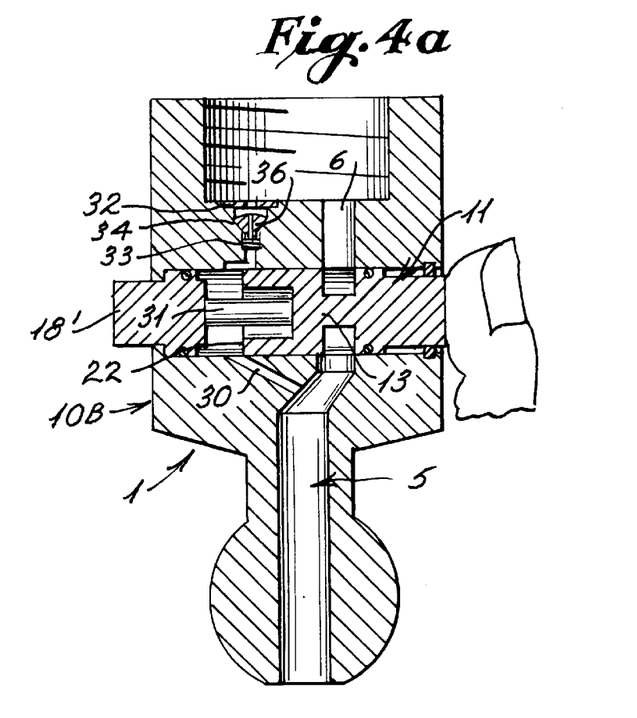
FIG. 4a is a cross-section view of a second embodiment of the invention showing a slide valve assembly seated within a cross bore in the valve housing and being manually moved to a first position wherein a primary fluid passageway is "open" to allow flow therethrough. In this embodiment, secondary flow relative to the slide valve assembly is regulated by a temperature responsive force generator mounted within a secondary fluid passageway.
Figure 4B:
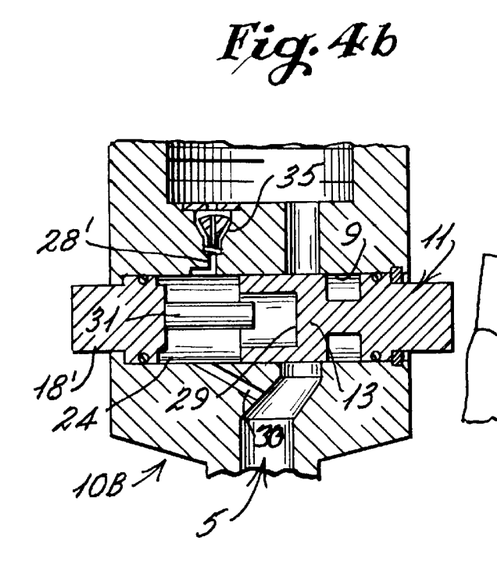
FIG. 4b is a partial cross-sectional view of the temperature responsive valve of FIG. 4a showing the slide valve assembly being moved to substantially terminate flow through the primary passageway when the fluid temperature is above a predetermiend activation temperature.
Figure 4C:
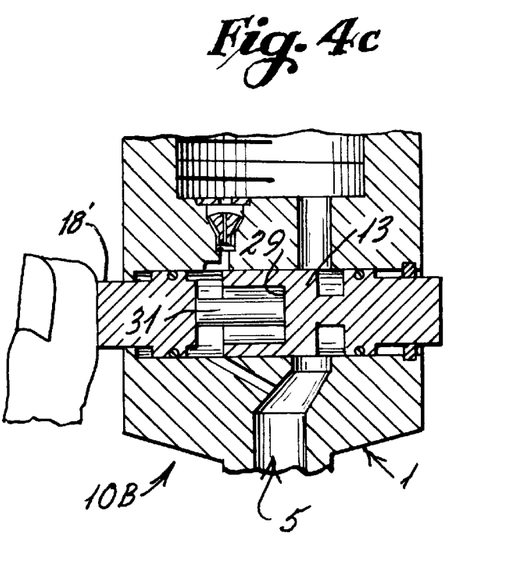
FIG. 4c is a partial cross-sectional view of the embodiment of FIG. 4a showing the slide valve assembly being manually moved by operation of a piston member to adjust the flow rate through the primary passageway when the fluid temperature is below a predetermined activation temperature.

With reference to FIGS. 4a–4c, a second embodiment of the invention is shown. In this embodiment, the valve 10B includes the same housing 1, slide valve assembly 11, primary flow channel 5 and bleed channel 30 as discussed above with respect to the embodiments of FIGS. 1–4 with the exception that the annular flange or skirt 22 of the piston member 13 need not be configured to cooperatively engage with an annular flange of a manually adjustable piston member. In the present embodiment, the manually adjustable piston 18' includes an extension element 31 which is provided for engaging the face 29 of the piston member 13 and thus limiting the opening movement of the slide valve assembly, as shown in FIG. 4a, so that the secondary fluid passageway 28' will be open to the pressure chamber 24 and the bleed channel 30 when the slide valve assembly is in the fully open position, as shown. The secondary fluid passageway 28', however, is normally substantially closed by a temperature responsive force generator which is mounted within a cavity 32 formed in the secondary fluid passageway. The force generator is shown, by way of example, as a temperature responsive valve which includes a temperature responsive spring 33, such as a SMA spring, on which is seated a valve body or plug 34. The valve body is tapered so as to cooperatively engage a conical valve seat 35 forward by the lower walls defining the cavity 32 to thereby substantially prevent fluid flow through the secondary fluid passageway. A small opening 36 is provided through the valve body so that the spring 33 is retained in heat exchange relationship with the fluid entering the valve 10B. When fluid temperature increases to the activation temperature, spring 33 will change state and expand, thereby lifting valve body 34 from the valve seat 35 and allowing fluid flow into the pressure chamber 24 wherein the pressure of the fluid will act to immediately shift the slide valve assembly 11 to the right, as shown in FIG. 4b, terminating or substantially terminating fluid flow through the primary passageway 5. Fluid within the chamber 24 will be drained through the bleed channel 30. When the fluid temperature falls below the activation temperature, the spring will again change state allowing the valve body 34 to be seated against valve seat 35, thus substantially closing the secondary fluid passageway 28' and thereby permitting the slide valve assembly to be manually opened, as shown in FIG. 4a. In FIG. 4c, the manually adjustable piston 18' is shown as being urged to move the slide valve assembly to a position to adjust the fluid flow rate through the primary fluid passageway when the fluid temperature is below the predetermined activation temperature. Further movement of the manually adjustable piston will result in the substantial termination of flow through the primary fluid passageway.

Figures 5, 6, 8:
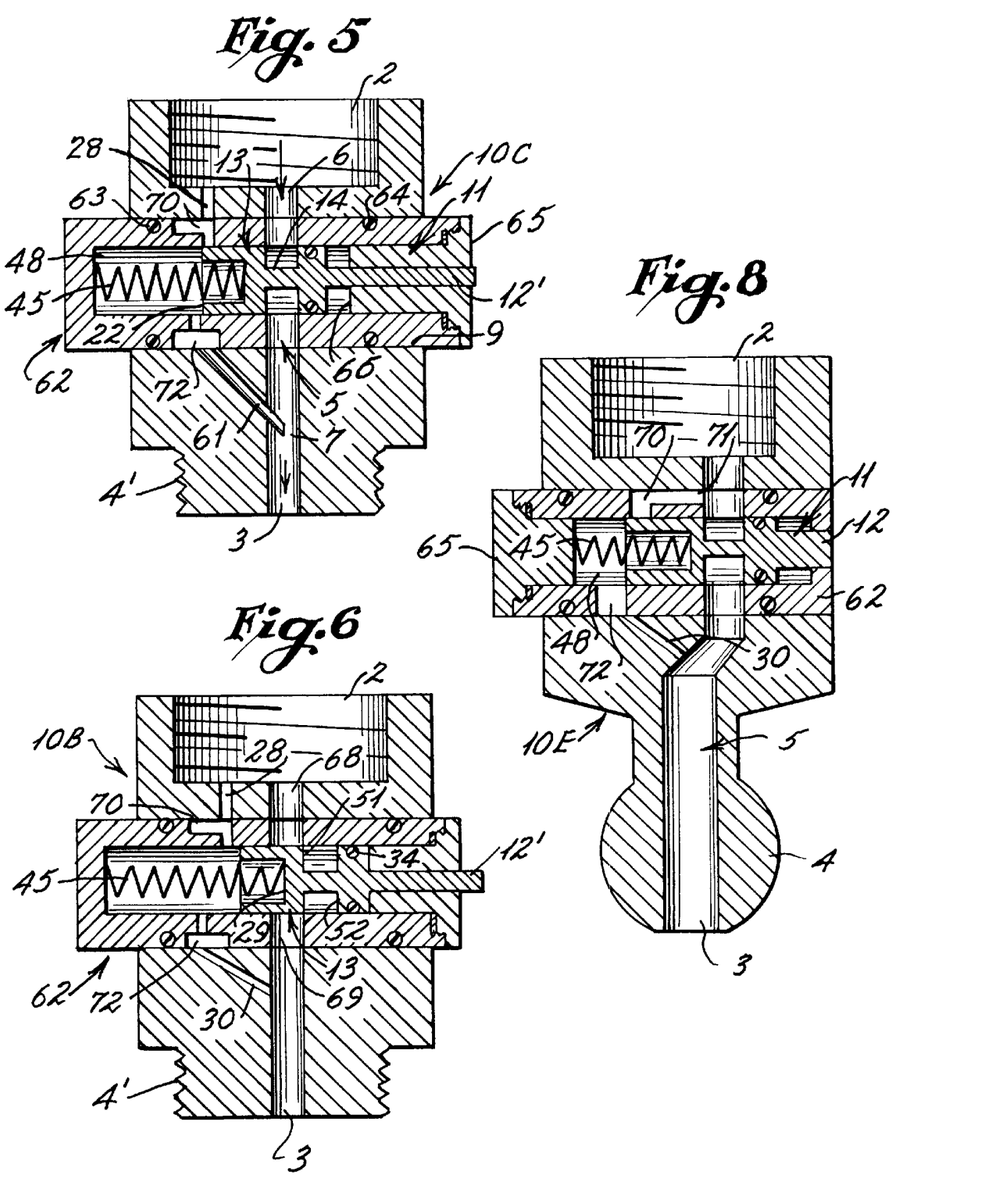
FIG. 5 is a cross-sectional view of a third embodiment of a manually reset temperature responsive valve of the present invention showing a slide valve assembly in an "open" position relative to a primary fluid passageway and wherein the slide valve assembly is mounted within a manually adjustable hollow piston. The embodiment also shows a venturi tube which extends from a bleed channel into the primary fluid passageway, which tube may be used with the other embodiments of the invention.
FIG. 6 is a cross-sectional view of the temperature responsive valve of FIG. 5 showing the slide valve assembly in a "closed" position relative to the hollow piston and primary fluid passageway.
FIG. 8 is a cross-sectional view of another embodiment of the invention which is similar to FIG. 7 except showing the secondary fluid passageway into the pressure chamber being formed in the hollow piston.

With specific reference to FIGS. 5 and 6, another embodiment of temperature responsive valve 10C is disclosed. In this embodiment, the slide valve assembly 11 is designed to be manually reset in a manner similar to that discussed with respect to the embodiment of FIGS. 1–4c. However, in this embodiment, the slide valve assembly 11 is not directly mounted within the bore 9 but is mounted within a hollow piston 62 which is slidably received within the bore. The piston 62 is sealed with respect to the bore to prevent leakage by a pair of O-rings 63 and 64 which are seated in appropriate annular recesses formed in spaced relationship toward the outer walls of the housing of the valve. The hollow piston 62 is closed at one end by a threaded cap 65 having a central opening therein through which a narrowed head extension 12' of the slide valve assembly is slidably receivable. Sufficient clearance is maintained between the extension 12' and the cap 65 to permit pressure to be relieved from a cavity formed between the shoulder portion 16 of the head and the inner end portion 66 of the cap during movement of the slide valve assembly between the fully "open" position shown in FIG. 5 and the "closed" position shown in FIG. 6.

In the embodiment of FIGS. 5 and 6, primary inlet and outlet openings 68 and 69 are formed within the hollow piston so as to be in alignment with the primary fluid passageway 5 when the slide valve assembly is in the fully "open" position shown in FIG. 5. In order to regulate the flow rate through the primary fluid passageway, the hollow piston 62 may be shifted laterally to realign the inlet and outlet openings 68 and 69 relative to the primary fluid passageway. This type of adjustment will be described in further detail with respect to the embodiments disclosed in FIGS. 14 and 15.

To provide fluid communication between a pressure chamber 48 in which the temperature responsive force generator, such as the SMA spring 45, is seated, the hollow piston 62 includes a somewhat L-shaped secondary fluid inlet 70 and a somewhat T-shaped secondary fluid outlet 72. Secondary fluid inlet 70 is generally retained in open fluid communication with secondary fluid passageway 28 at all times. However, as shown in FIG. 5, the secondary fluid inlet 70 is partially obstructed by the skirt 22 of the piston member 13 of the slide valve assembly 11 when the slide valve assembly is in the "open" position shown in FIG. 5. In this position, the pressure chamber 48 is in open communication through the secondary fluid outlet 72 to the bleed channel 30 so that a continuous flow is established through the pressure chamber. A small clearance is provided between the skirt portion 22 and the secondary inlet 70 to allow fluid entering the valve at inlet 2 to be in direct heat exchange communication with the temperature responsive force generator 45. In other embodiments, the slide valve assembly may be formed of a metallic heat conducting material so that the element 45 receives heat exchange through conduction through the piston member 13 of the slide valve assembly when in the position shown in FIG. 5.

In this embodiment, when fluid temperature is above the predetermined activation temperature, the slide valve assembly is shifted toward the "closed" position of FIG. 6. As soon as the secondary fluid inlet 70 is directly open to the pressure chamber 48, fluid pressure from the secondary fluid passageway 28 acts upon the inner face 29 of the piston member 13 of the slide valve assembly, thereby driving the slide valve assembly to the fully "closed" position shown in FIG. 6. When the temperature drops below the predetermined activation temperature, the outer extension 60 of the slide valve assembly may be manually pushed to the left, as shown in the drawing figures, to thereby re-open the primary fluid passageway 5 through the valve.

To further facilitate fluid flow through the bleed channel 30 from the pressure chamber 48, a venturi tube 61 may be fitted within the channel so as to extend outwardly to the central portion of the primary fluid passageway, as shown in FIG. 5. The outer end of the tube 61 is configured to extend generally parallel with respect to a central axis of the primary fluid passageway so that the fluid flow therethrough will make the most efficient venturi effect to draw fluid through the channel 60 from the pressure chamber. The venturi tube 61 may be used with any embodiment of the invention.

Figure 7:
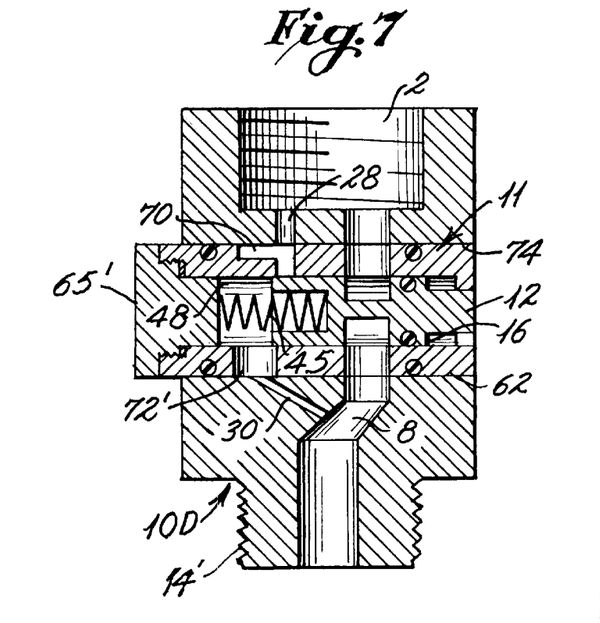
FIG. 7 is a cross-sectional of a temperature responsive valve similar to FIGS. 5 and 6 wherein the primary fluid passageway is offset relative to a central axis of the valve.
Figure 9:
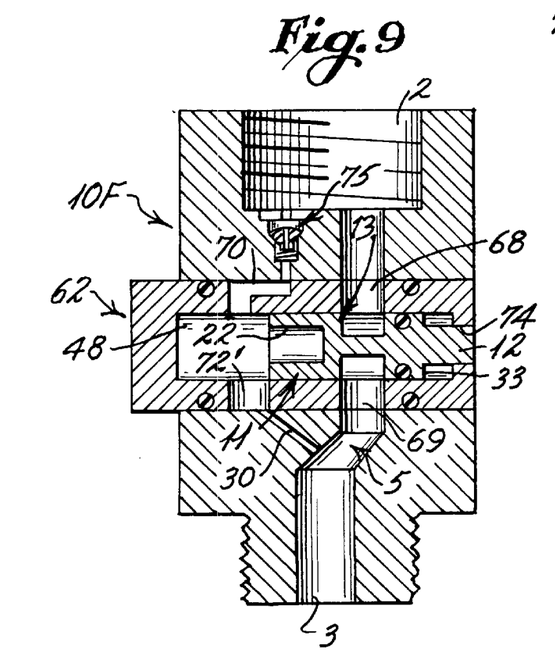
FIG. 9 is a cross-sectional view of another embodiment of the present invention including a secondary temperature responsive valve mounted within the secondary fluid passageway to regulate flow to the pressure chamber in which the slide valve assembly is housed.
Figure 10:
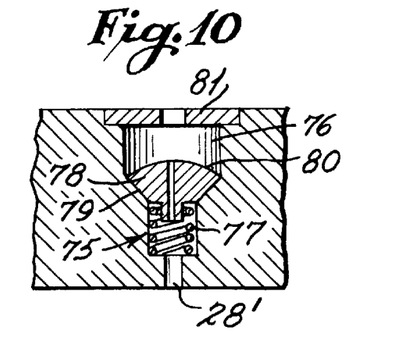
FIG. 10 is an enlarged cross-sectional view of the secondary temperature response valve of FIG. 9.

With specific reference to FIG. 7, a modified embodiment of the temperature responsive valve 10D similar to the one shown in FIGS. 5 and 6 is disclosed. In this embodiment, the hollow piston 62 is constructed so that cap portions 65' is threadingly received to close the pressure chamber 48 in which the temperature responsive fluid regulator, SMA spring 45, is seated and no opening is provided therethrough. The replacement or maintenancing of the pressure chamber and spring is thus facilitated. In this embodiment, the primary fluid passageway also includes the intermediate angled section 8 similar to the angled section disclosed in the embodiment of FIGS. 1–4. The bleed channel 30 is shown as communicating along this angled portion of the primary fluid passageway. To allow clearance for the head 60 of the slide valve assembly 11, an opening 74 is provided in the opposite end of the hollow piston 62 from the cap 65. Pressure between the shoulder 16 of the slide valve assembly and the end wall of the hollow piston 62 is relieved by providing a clearance between the opening 74 and the head portion 12 of the slide valve assembly. Further, in this embodiment, the secondary fluid outlet 72' is being shown as being continuously open and not T-shaped as shown in the embodiments of FIGS. 5 and 6.

With specific reference to FIG. 8, a modification of the embodiments disclosed in FIGS. 5–7 is disclosed. In this modification, the structure and operation of the valve 10E is substantially identical to that shown in FIG. 7 with the exception the valve housing is shown as having a bulbous end 4 as opposed to a threaded end 4'. In addition, in this embodiment, the secondary fluid passageway 71 is shown as being formed in the hollow piston which communicates with opening 70 forming the inlet opening through the hollow piston 62 into the pressure chamber 48. The operation of the valve is otherwise the same as with respect to the embodiments of FIGS. 5–7. It should therefore be noted that the secondary fluid passageway may be either formed through a portion of the valve housing or in the hollow piston 62 in order to communicate the fluid pressure chamber 48 with fluid flowing to the inlet 2 of the valve assembly.

With specific reference to FIGS. 9–12, another embodiment of manually resettable temperature responsive valve 10F is disclosed which is operable in a manner similar to that disclosed in FIGS. 4a–4c. In this embodiment, the temperature responsive force generator is in the form of a temperature responsive valve 75 which is disposed within a cavity 76 formed along the secondary fluid passageway 28'. The temperature responsive valve 75 includes a temperature responsive spring 77, such as a SMA spring, which is seated in the lower portion of the cavity 76 and on which is seated a valve body or plunger 78. The outer portion of the valve body 78 is normally designed to be seated against a generally conical valve seat 79 so as to prevent fluid flow around the body 78 into the fluid passageway 28'. To allow a trickle or bleed fluid flow, a small passageway 80 is provided through the central portion of the body. The bleed passageway 80 will allow the spring 77 to be in continuous heat exchange relationship with respect to fluid entering the valve through inlet 12. When temperature is above a predetermined activation temperature, as sensed by the SMA spring 77, the spring will change state and expand, thus lifting the body 78 from the valve seat 79 and providing flow clearance between the body 78 and the fluid passageway 28'. A retaining disk 81 having a central inlet opening therein seals the valve 75 within the cavity 76.

In the operation of the valve of the present embodiment, when temperature is above the predetermined activation temperature, as sensed by the temperature responsive force generator or SMA spring 77, the spring will change state and expand, lifting the body 78 from the valve seat 79 allowing fluid flow through secondary fluid passageway into the pressure chamber 48. In this embodiment, sufficient clearance is allowed between the skirt 22 of the piston member 13 of the slide valve assembly 11 and the pressure chamber 48 to allow fluid flow to enter into the chamber 48. The size of the bleed channel 30 is determined to allow pressure to be built up within the chamber 48 to a degree sufficient to allow the slide valve assembly to be moved from the "open" position shown in FIG. 9 to a "closed" position wherein the skirt 22 blocks the primary fluid passageway 5 by closing the inlet and outlet openings 68 and 69 in the hollow piston 62. The bleed channel prevents fluid pressure from building up within the chamber 48 until the spring 77 opens the valve body 78. When the flow rate through the passageway 28' exceeds the flow capacity of the bleed channel 30, the slide valve assembly is moved to the "closed" position. When temperatures drop below the predetermined activation temperature, the spring 77 will change state allowing the pressure on the body 78 of the fluid entering the fluid inlet 2 to reseat the body 78 against the valve seat 79, thereby substantially terminating flow through secondary passageway 28'.

Figure 11:
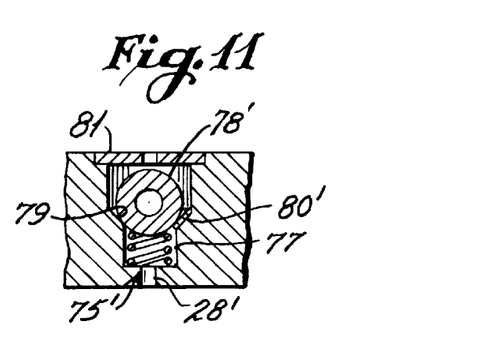
FIGS. 11 and 12 are enlarged cross-sectional views of alternate secondary temperature response valves for use with the embodiment of FIG. 9.
Figure 12:
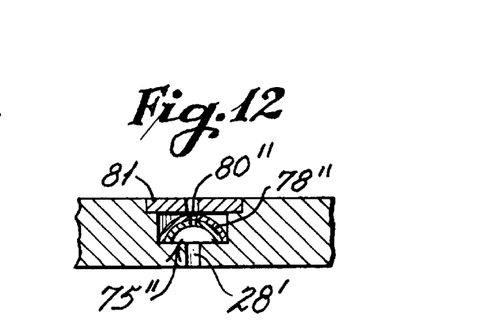

With specific reference to FIGS. 11 and 12, alternate embodiments of temperature responsive valves controlling fluid passage to the secondary fluid passageway 28' are disclosed. In the embodiment shown in FIG. 11, a temperature responsive force generator is shown in the form of a SMA spring 77 similar to that of FIG. 10. The valve 75' includes a body member 78' shaped as a hollow ball element which is seated on the valve seat 79. The valve seat includes grooves 80' for allowing a trickle of fluid flow continuously around the ball so that the spring 77 is in heat exchange relationship with fluid entering the inlet of the anti-scald valve. When a temperature above the predetermined temperature is sensed by the spring 77, the ball 78' is elevated slightly but will not block the inlet through the covering disk 81, thereby permitting fluid flow through the secondary fluid passageway 28'.

In FIG. 12, the temperature responsive valve 75" includes a bi-metallic spring disk 78" is provided which substantially blocks the opening in the covering disk 81. A small opening 80" is provided through the bimetallic disk to allow a bleed at all times when fluid is applied to the inlet of the anti-scald valve. When temperature is above the predetermined temperature, the bimetallic disk snaps away from the opening in the covering disk 81, thereby allowing fluid flow through and around the disk 78' to the secondary fluid passageway 28'.

Figure 13:
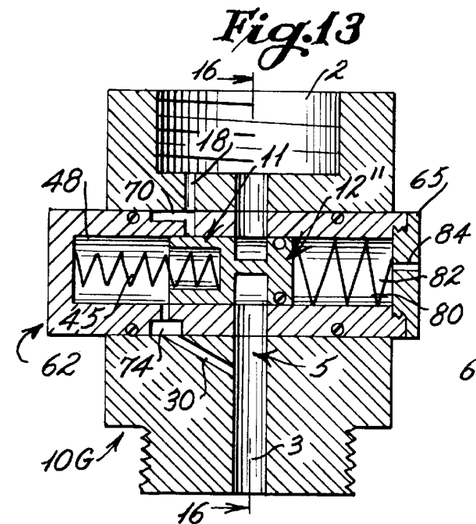
FIG. 13 is a cross-sectional view similar to FIG. 5 except showing the slide valve assembly including an automatic return spring to urge the slide valve assembly to an "open" position when fluid temperature falls below the predetermined activation temperature.
Figure 14:
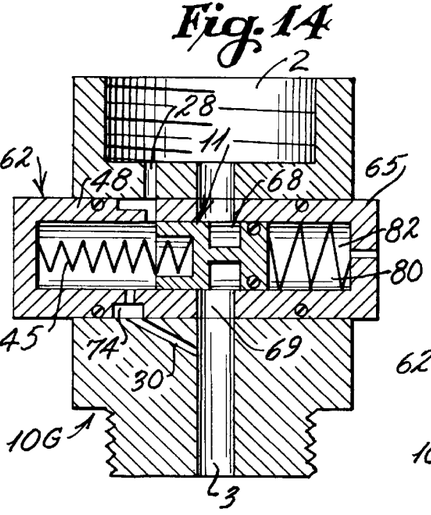
FIG. 14 is a cross-sectional view of the valve of FIG. 13 showing the slide valve assembly being initially moved in the direction of the arrow toward the "closed" position when fluid temperatures elevate to the predetermined activation temperatures.
Figure 15:
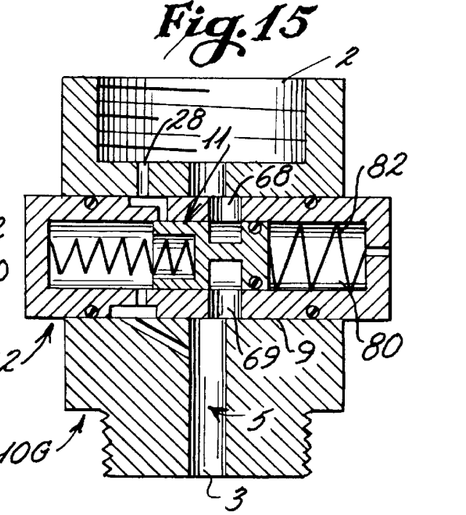
FIG. 15 is a cross-sectional view of the valve of FIG. 13 showing manual adjustment of a hollow piston to regulate flow rate through the valve at temperatures below the activation temperature.

With specific reference to FIGS. 13–15, another embodiment of the temperature responsive valve 10G is disclosed which is similar to the embodiments previously discussed which incorporate a hollow piston 62 in which the slide valve assembly 11 is slidably retained. However, in this embodiment, the slide valve assembly is designed to be automatically reset or moved to the "open" position when the temperature of the fluid entering the inlet 2 of the valve assembly drops below the predetermined activation temperature. The components of the valve assembly which are in common with the embodiments disclosed in FIGS. 5 and 6 have the same reference number. In this embodiment, however, the slide valve assembly 11 does not include an outer extension, such as shown at 12' in FIG. 5. Rather, the head 12" of the slide valve assembly is formed as a piston element which is sealed against the inner portion of the hollow piston 62 by an O-ring. A secondary spring cavity 81 is defined between the head 12" of the slide valve assembly and the cap 65 of the hollow piston 62. A conventional spring 82 is mounted within the secondary spring cavity 81 and provides a constant force opposing the temperature responsive force generator or SMA spring 45. The force of the spring 82 is sufficient to return the slide valve assembly 11 to its "open" position when the fluid temperature drops below the predetermined activation temperature and after the slide valve assembly has been moved to a fully "closed" position, as exemplified by the embodiment of FIG. 6. To relieve pressure within the secondary spring chamber 81, a bleed opening 84 is provided through the cap 65.

In FIG. 13, the valve is shown in a fully "open" position, allowing fluid flow through the primary fluid passageway 5. When the fluid temperature elevates above the predetermined activation temperature, the SMA spring 45 will initially drive the slide valve assembly towards the right, as shown in FIG. 14, opening the secondary fluid inlet 70 into the pressure chamber 48 against the force of secondary spring 82. At this point, pressure will build up within the pressure chamber 48, driving the slide valve assembly to a position to fully close the fluid passageway 5 through the valve, as exemplified again by the valve shown in FIG. 6.

In this embodiment and with the previous embodiments incorporating the slidable hollow piston 62, the flow rate through the valve may be adjusted by shifting the entire hollow piston relative to the bore 9. In this respect, FIG. 15 discloses the manual adjustment of the flow rate through the valve 10G by shifting the hollow piston 62 towards the right. The primary fluid inlet and outlet openings 68 and 69 thereof are offset with respect to the primary fluid passageway 5, thus regulating the flow rate without otherwise affecting the positioning of the slide valve assembly 11.

In the embodiments of the invention disclosed in FIGS. 5–15, the hollow piston 62 is retained within the bore 9 by providing a pin registration member which acts to limit the lateral movement of the assembly with respect to the bore 20. With specific reference to FIGS. 16–18, the pin registration assembly is disclosed in greater detail. It should be noted that other means of retaining the hollow sleeve 62 within the bore 60 such as appropriately spaced snap rings may also be utilized in a manner as discussed with respect to the embodiment of FIGS. 1–4.

Figure 16:
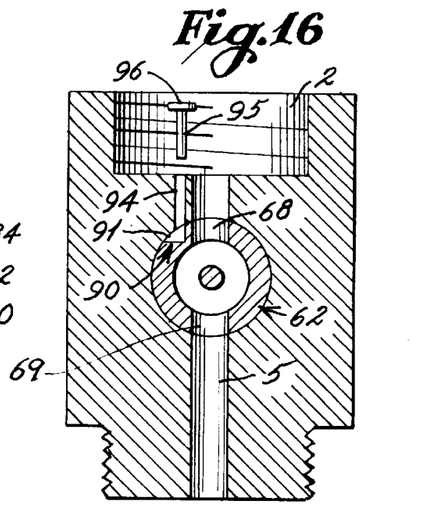
FIG. 16 is a cross-sectional view taken along line 16—16 of FIG. 13 showing a registration pin for controlling the orientation of the hollow piston within the bore of the valve housing.
Figure 17:
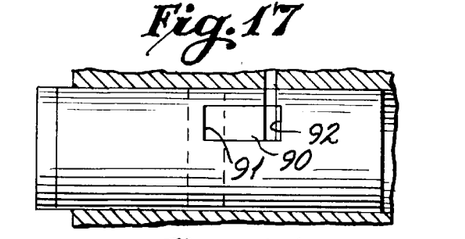
FIGS. 17 and 18 are cross-sectional views showing the orientation of the pin of FIG. 16 relative to a groove formed in the hollow piston.
Figure 18:
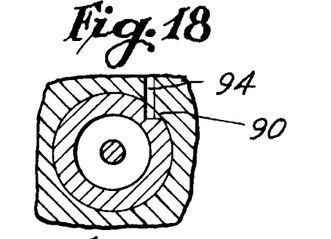

With respect to FIGS. 16–18, the hollow piston 62 includes a right angle groove 90 formed therein having end walls 91 and 92. An open hole or channel 94 is provided through the housing generally parallel to the fluid passageway 15 and extending inwardly from the inlet portion 2 of the valve in which the registration pin 95 is selectively seated. The pin includes an enlarged head 96 for resting the pin within the hole 94. When inserted, the pin seats within the groove 90, as shown in FIGS. 17 and 18. As the hollow piston 62 is moved relative to the bore 9, its movement is limited by the pin 95 engaging one of the opposite end walls 91 or 92 defined by the groove 90. In this manner, not only is the lateral motion of the hollow piston 62 regulated with respect to the bore, but the orientation of the piston 62 is also retained as the piston member cannot rotate within the bore due to the engagement of the registration pin 95 with the walls defining the groove 90. This ensures proper alignment of the primary inlet and outlet openings 68 and 69 of the piston 62 with the primary fluid passageway 5. Whenever the piston member 62 or the slide valve assembly needs to be maintenanced, the registration pin 95 is simply lifted from the hole 94 and thereafter the hollow piston 62 is removed from the bore 9.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A temperature responsive valve for controlling flow of a fluid through a conduit comprising:

a housing having a fluid inlet and a fluid outlet and a primary fluid passageway extending between said fluid inlet and said fluid outlet;

a bore in said housing extending transversely to and intersecting with said primary fluid passageway;

a slide valve assembly slidably disposed within said bore between a first position wherein fluid may flow through said primary fluid passageway to a second position wherein fluid flow through said primary fluid passageway is at least substantially terminated, said slide valve assembly including a piston member seated within a pressure chamber defined within said bore;

means for communicating said fluid inlet with said pressure chamber;

a bleed channel communicating said pressure chamber with said primary fluid passageway and said fluid outlet; and said means for communicating said fluid inlet with said pressure chamber including a means responsive to temperature mounted within said housing and being operative to cause fluid to flow into said pressure chamber when the temperature of the fluid is above a predetermined temperature so as to apply a force to said piston member to move said slide valve assembly from said first to said second position to at least substantially close said primary fluid passageway.

2. The temperature responsive valve of claim 1 wherein said means for communicating said fluid inlet with said pressure chamber includes a secondary fluid passageway.

3. The temperature responsive valve of claim 2 wherein said slide valve assembly includes a stem portion which extends from said piston member to a head portion, said piston member and said head portion including opposing faces which are subject to equal pressure for all positions of said piston member.

4. The temperature responsive valve of claim 3 wherein said piston member at least partially obstructs said secondary fluid passageway into said pressure chamber when said slide valve assembly is in said first position and said slide valve assembly being urged by said means responsive to temperature for generating a force to open said secondary fluid passageway to said pressure chamber at a fluid temperature above said predetermined temperature such that the pressure of fluid flowing through said secondary fluid passageway forces said slide valve assembly to said second position.

5. The temperature responsive valve of claim 3 wherein said bleed channel includes means for creating a venturi communicating said pressure chamber to said primary fluid passageway between said bore and said fluid outlet of said housing whereby said means for creating a venturi creates a reduced pressure to regulate passage of fluid through said pressure chamber from said secondary fluid passageway.

6. The temperature responsive valve of claim 5 where said means for creating a venturi includes a tube extending from said bleed channel into said primary fluid passageway.

7. The temperature responsive valve of claim 3 in which said bore includes first and second opposite openings into said housing, said slide valve assembly head portion extending through a first of said opposite openings when said slide valve assembly is in said second position whereby said head portion is manually engageable to urge said slide valve assembly to said first position when the fluid temperature is below the predetermined temperature.

8. The temperature responsive valve of claim 7 including a manually operable piston mounted through said second of said opposite openings into said housing, means for sealing said manually operable piston relative to said second opening so as to prevent fluid flow therethrough, and said manually operable piston being manually adjustable to urge said slide valve assembly from said first to said second position to thereby at least substantially terminate fluid flow through said primary fluid passageway.

9. The temperature responsive valve of claim 8 in which said manually operable piston is a hollow piston having first and second ends, said hollow piston being extendable through each of said first and second opposite openings of said bore in said housing, and said hollow piston including means for communicating an inlet portion of said primary fluid passageway with an outlet portion thereof.

10. The temperature responsive valve of claim 9 in which said means for communicating an inlet portion of said primary fluid passageway with an outlet portion thereof includes a primary fluid inlet and a primary fluid outlet which are selectively alignable with said primary fluid passageway, said hollow piston including a secondary fluid inlet for communicating said secondary fluid passageway with said pressure chamber and a secondary fluid outlet for communicating said pressure chamber with said bleed channel whereby said pressure chamber is defined within said hollow piston, and said slide valve assembly being slidably disposed within said hollow piston so as to be movable therein between the first and second positions.

11. The temperature responsive valve of claim 10 in which said secondary fluid passageway is formed in said hollow piston between said secondary fluid inlet and said primary fluid passageway.

12. The temperature responsive valve of claim 10 including means for limiting lateral movement of said hollow piston relative to said bore and for limiting rotation of said hollow piston relative to said bore.

13. The temperature responsive valve of claim 12 in which said means for limiting lateral movement includes a pin member extending into said bore of said housing, a slot formed in said hollow piston so as to define opposing abutment surfaces, said pin member being engageable with said abutment surfaces to thereby limit the lateral movement of said hollow piston relative to said bore.

14. The temperature responsive valve of claim 10 wherein said means for generating a force responsive to temperature includes a means which expands in response to the fluid temperature being above the predetermined temperature, and said means which expands is mounted within said pressure chamber so as to be in operable engagement with said piston member of said slide valve assembly.

15. The temperature responsive valve of claim 14 in which said means which expands is a SMA spring.

16. The temperature responsive valve of claim 10 wherein said means for generating a force responsive to temperature includes a valve means mounted to control flow through said secondary fluid passageway, said valve means being normally substantially closed to limit fluid flow through said secondary fluid passageway at temperatures below the predetermined temperature and being opened to permit fluid flow through said secondary fluid passageway at temperatures above said predetermined temperature.

17. The temperature responsive valve of claim 16 in which said valve means includes a valve body seated on a valve seat and engaging a temperature responsive expansion means, said temperature responsive expansion means being activated at temperatures above the predetermined temperature to shift said valve body relative said valve seat to allow flow through said valve means.

18. The temperature responsive valve of claim 16 in which said valve means includes a valve inlet and a valve outlet and a bi-metallic member mounted so as to substantially close said flow between said valve inlet and said valve outlet when the fluid temperature is below the predetermined temperature and which is moveable to open the valve inlet to the valve outlet at temperatures above the predetermined temperature.

19. The temperature responsive valve of claim 10 wherein said piston member at least partially obstructs said secondary fluid passageway into said pressure chamber when said slide valve assembly is in said first position and said slide valve assembly being urged by said means responsive to temperature for generating a force to open said secondary fluid passageway to said pressure chamber at a fluid temperature above said predetermined temperature such that the pressure of fluid flowing through said secondary fluid passageway forces said slide valve assembly to said second position.

20. The temperature responsive valve of claim 9 wherein said slide valve assembly is mounted within said hollow piston with said piston member being spaced from said first end to thereby define said pressure chamber therebetween, said means for communicating an inlet portion of said primary fluid passageway with an outlet portion thereof including a primary fluid inlet and a primary fluid outlet which are selectively alignable with said primary fluid passageway, said hollow piston also including a secondary fluid inlet for communicating said secondary fluid passageway with said pressure chamber and a secondary fluid outlet for communicating said pressure chamber with said bleed channel, and said hollow piston being moveable within said bore so as to adjust the fluid flow rate through said primary fluid passageway.

21. The temperature responsive valve of claim 20 in which said secondary fluid passageway is formed in said hollow piston between said secondary fluid inlet and said primary fluid passageway.

22. The temperature responsive valve of claim 20 wherein said means for generating a force responsive to temperature includes a means which expands in response to the fluid temperature being above the predetermined temperature and which means is mounted within said pressure chamber so be in operable engagement with said piston of said slide valve assembly.

23. The temperature responsive valve of claim 22 including a secondary chamber defined between said head portion of said slide valve assembly and said second end of said hollow piston, a means mounted within said secondary spring cavity for urging said slide valve assembly towards the first position, and said means for urging having sufficient force to urge said slide valve assembly to said first position against said means which expands when the fluid temperature is below the predetermined temperature.

24. The temperature responsive valve of claim 23 in which said means which expands is a SMA spring.

25. The temperature responsive valve of claim 23 in which said hollow piston includes an opening in said second end thereof, said head portion of said slide valve assembly including an extension extending through said opening in said second end of said hollow piston which extension is manually engageable to move said slide valve assembly from the second position to the first position after the slide valve assembly has been moved to the second position and when fluid temperature is below the predetermined temperature.

26. The temperature responsive valve of claim 23 including means for limiting lateral movement of said hollow piston relative to said bore and for limiting rotation of said hollow piston relative to said bore.

27. The temperature responsive valve of claim 26 in which said means for limiting lateral movement includes a pin member extending into said bore of said housing, a slot formed in said hollow piston so as to define opposing abutment surfaces, said pin member being engageable with said abutment surfaces to thereby limit the lateral movement of said hollow piston relative to said bore.

28. A method for controlling fluid flow through a valve in response to fluid temperature being above a predetermined temperature and wherein the valve includes a fluid passageway extending between a fluid inlet and a fluid outlet and wherein a valve assembly is movable from a first position allowing fluid flow through the fluid passageway to a second position to terminate fluid flow through the fluid passageway, and wherein the valve assembly is acted on by fluid pressure in a pressure chamber of the valve, the method of controlling including the steps of:
   a) providing means which is responsive to the temperature of fluid applied to the inlet of the valve to supply fluid from the fluid inlet to the pressure chamber when the fluid temperature is above the predetermined temperature; and
   b) utilizing pressure of the fluid supplied to the pressure chamber to at least assist in movement of the valve assembly from the first position to the second position to thereby at least substantially terminate fluid flow through the fluid passageway of the valve.

29. The method of the claim 25 including the additional step of providing a bleed from the pressure chamber to thereby regulate the fluid flow therethrough.

30. A method for controlling fluid flow through a valve in response to fluid temperature being above a predetermined temperature and wherein the valve includes a fluid passageway extending between a fluid inlet and a fluid outlet and wherein a valve assembly is movable from a first position allowing fluid flow through the fluid passageway to a second position to terminate fluid flow through the fluid passageway, and wherein the valve assembly is acted on by fluid pressure in a pressure chamber of the valve, the method of controlling including the steps of:
   a) providing a temperature responsive force-generator within the pressure chamber of the valve so as to be operable to move the valve assembly from the first position toward the second position at temperatures above the predetermined temperature;
   b) maintaining the temperature responsive force generator in heat exchange relationship to fluid applied to the inlet of the valve;
   c) initiating movement of the valve assembly from the first position to the second position by action of the temperature responsive force generator at temperatures above the predetermined temperature; and
   d) thereafter utilizing pressure of a secondary fluid flow to facilitate movement of the valve assembly from said first position to said second position.

31. The method of claim 30 including the additional step of providing a bleed from the pressure chamber to thereby regulate the secondary fluid flow therethrough.

32. The method of claim 31 including the additional step of using the flow of fluid through the fluid passageway to create a venturi bleed.

33. The method of claim 31 including the additional step of manually adjusting the valve member relative to the fluid passageway to control the flow rate therethrough by positioning said valve member intermediate said first and second positions.

34. A temperature responsive valve for controlling flow of a fluid through a conduit comprising:
   a housing having a fluid inlet and a fluid outlet and a primary fluid passageway extending between said fluid inlet and said fluid outlet;
   a bore through said housing extending transversely to and intersecting with said primary fluid passageway;
   a secondary fluid passageway communicating said fluid inlet with said bore;
   a bleed channel communicating said bore with said primary fluid passageway and said fluid outlet;
   a slide valve assembly slidably disposed within said bore between a first position wherein fluid may flow through said primary fluid passageway to a second position wherein flow through said primary fluid passageway is at least substantially terminated;
   a SMA spring disposed within said bore and in fluid communication with said secondary and said bleed fluid passageways whereby said SMA spring is continuously exposed to the temperature of fluid flowing into said housing, and said SMA spring being operable at a predetermined temperature to urge said slide valve assembly from said first toward said second position in response to the fluid temperature being above said predetermined temperature.

35. The temperature responsive valve of claim 34 including a second spring mounted within said bore adjacent an opposite end of said slide valve assembly from said SMA spring, said second spring having sufficient force to urge said slide valve assembly from the second position to the first position at a fluid temperature below the predetermined temperature.

36. The temperature responsive valve of claim 34 including the additional step of creating a venturi effect along said bleed channel from the pressure chamber to the primary fluid passageway.

* * * * *